June 6, 1939. W. W. SAYERS ET AL Re. 21,109

SETTLING TANK

Original Filed June 15, 1935 4 Sheets-Sheet 1

Inventors
William W. Sayers
Harold F. Watson
Richard F. Bergmann
by [illegible]
Attorneys.

June 6, 1939. W. W. SAYERS ET AL Re. 21,109

SETTLING TANK

Original Filed June 15, 1935 4 Sheets-Sheet 2

Inventors
William W. Sayers
Harold F. Watson
Richard F. Bergmann
by Mills & Carter
Attorneys

SETTLING TANK

Original Filed June 15, 1935 4 Sheets-Sheet 3

Inventors
William W. Sayers
Harold F. Watson
Richard F. Bergmann
by Parker & Carter
Attorneys June 6, 1939. W. W. SAYERS ET AL Re. 21,109

SETTLING TANK

Original Filed June 15, 1935 4 Sheets-Sheet 4

Inventors
William W. Sayers
Harold F. Watson
Richard F. Bergmann
by Parker & Carter
Attorneys.

Reissued June 6, 1939 Re. 21,109

UNITED STATES PATENT OFFICE 21,109

SETTLING TANK

William W. Sayers, Chicago, Ill., and Richard F. Bergmann, Cleveland, Ohio, and Harold F. Watson, Philadelphia, Pa., assignors to Link-Belt Company, Chicago, Ill., a corporation of Illinois Original No. 2,073,810, dated March 16, 1937, Serial No. 26,780, June 15, 1935. Application for reissue July 23, 1938, Serial No. 221,028

16 Claims. (Cl. 210—55)

This invention relates to an apparatus and a process for handling fluid material which includes a mixture of liquids and solids.

It has for one object to provide means for introducing such fluid into a settling tank. Another object is to provide means for so introducing such fluid as to reduce to a minimum currents within the body of the fluid. Another object is to provide a combined support and fluid entrance. Another object is to provide means in connection with a settling tank for introducing fluid at a point at or close to the bottom of the tank and for supporting an assembly at a point generally above the fluid entrance and above the surface of liquid within the tank.

Other objects will appear from time to time throughout the specification and claims.

The invention is illustrated more or less diagrammatically in the accompanying drawings, wherein—

Like parts are indicated by like characters throughout the specification and drawings.

Figure 1:
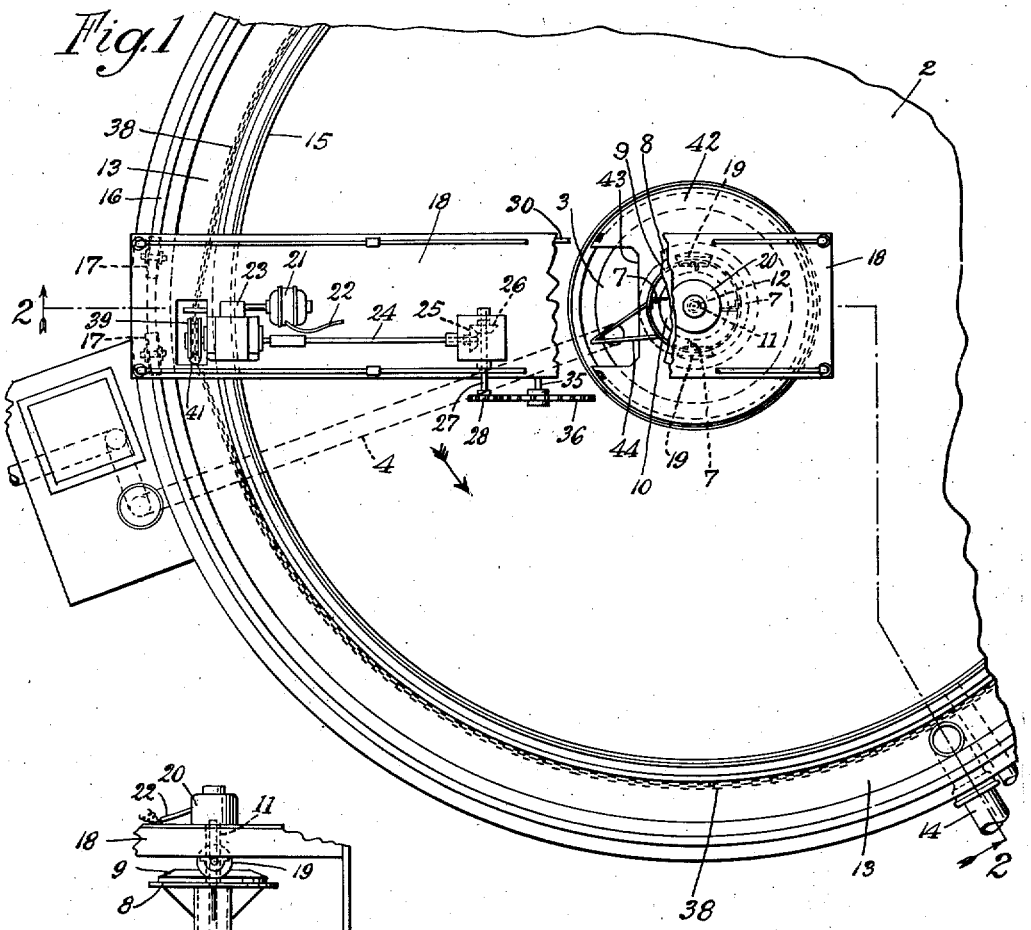
Figure 1 is a plan view.
Figure 2:
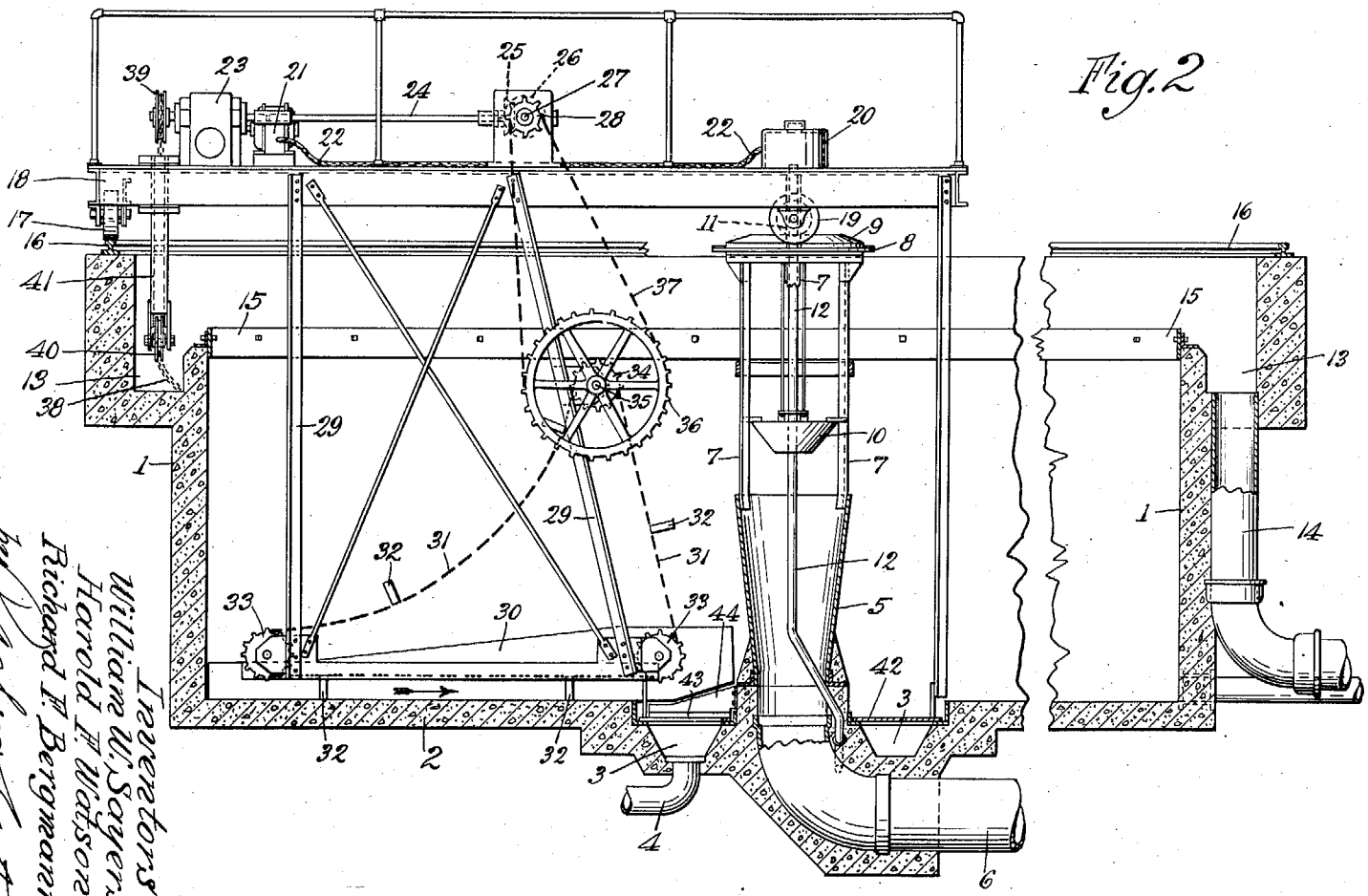
Figure 2 is a vertical section taken along the line 2—2 of Figure 1.

The invention, in the form illustrated herewith is applied to a settling tank having side walls 1 and a bottom wall or floor 2 provided generally at its center with an annular sludge trough 3 from which a draw-off connection 4 can withdraw the sludge. In the form illustrated in Figures 1 and 2, the funnel 5 extends upwardly from the bottom of the tank. Discharging into it is an influent conduit 6. Extending upwardly from the upper lip of the funnel are a series of structural angle supports 7, which supports carry a platform 8 to support a turn table 9. Below the platform and above the open mouth of the funnel mounted on the structural angle supports is a conical deflector plate 10, apertured at the center but the major part of the stream of liquid passing up through the funnel 5 is deflected laterally by the plate 10. A pivot 11 projects upwardly from the center of the turn table 9.

An electrical conduit 12 passes upwardly through the funnel 5, and the pivot 11. The use of the pivot and the conduit will be described below.

About the circumference of the tank is an overflow trough 13 adapted to receive effluent discharged over the upper edge of the tank. An effluent conduit 14 is provided. A weir 15 which may be adjustable is provided about the upper edge of the tank. The purpose of this weir is to assure the uniform distribution of flow over the periphery of the tank. If adjustable it can be adjusted as to height and thus it controls to some degree the discharge of effluent.

On the top wall of the tank is a track 16 which is concentric with the tank. By means of wheels or rollers 17 one end of a bridge structure 18 is supported upon the track. The bridge extends inwardly beyond the center of the tank and is engaged and pivoted upon the pivot member 11. Two or more beveled rollers 19 are mounted upon the bridge and rest upon the beveled roller race 9, thus supporting the bridge at one end upon this race.

A current collector 20 is positioned on the bridge above the pivot 11 and through any suitable means, not here shown, it is connected with the conduit 12 so that electrical current is furnished for the operation of the mechanism on the bridge.

A motor 21 is mounted on the bridge and by means of a conduit 22 is connected with the conduit 12 and hence with the source of electrical current. Through suitable reduction gearing positioned within a housing 23 the motor drives a shaft 24. At its inboard end the shaft 24 carries a beveled gear 25 which meshes with a second beveled gear 26 on a shaft 27 which carries a sprocket 28.

Depending downwardly from the bridge is a carrying structure 29. At its lower edge it carries a sludge plate 30 and there is mounted upon it a sludge conveyor formed of a pair of chains 31 carrying flights 32. The chain passes about idlers 33 and is driven by a sprocket 34 on a shaft 35 which carries a larger sprocket 36 which is engaged with a drive chain 37 which also engages and is driven by the sprocket 28. By this means the conveyor may be driven in the direction of the arrow shown in Figure 2, and moves sludge toward the center of the tank to discharge it into the sludge trough 3.

Means are preferably provided for causing the bridge assembly to move about the tank so that the entire floor of the tank will be swept by the sludge plate 30 and by the radially moving conveyor 31, 32.

While the bridge may be driven by any desired means, in the form illustrated herewith an endless chain 38 lies within the overflow trough 13 and is engaged by the pocketed wheel 39 on the shaft 24. It may pass upward from the trough 13 to the pocketed wheel over a sheave 40 and through the hollow arm 41, which carries the sheave.

Moving with the bridge assembly is a sludge trough cover plate 42 which is provided with an opening 43, positioned opposite the conveyor 31, 32 so that that conveyor as it moves material toward the center of the tank, can always discharge it through the opening in the sludge trough cover plate.

Since the conveyor 31, 32 does not pass over the sludge trough cover plate 42, some other means must be provided for moving any sludge which may deposit on the cover plate into the trough. This is accomplished by a plow or scraper 44 which is fixed to the member or funnel 5 and overlies the sludge trough cover plate. As will be seen from Figure 2, the sludge plate 30 is shaped to pass over and clear the plow 44.

Figure 3:
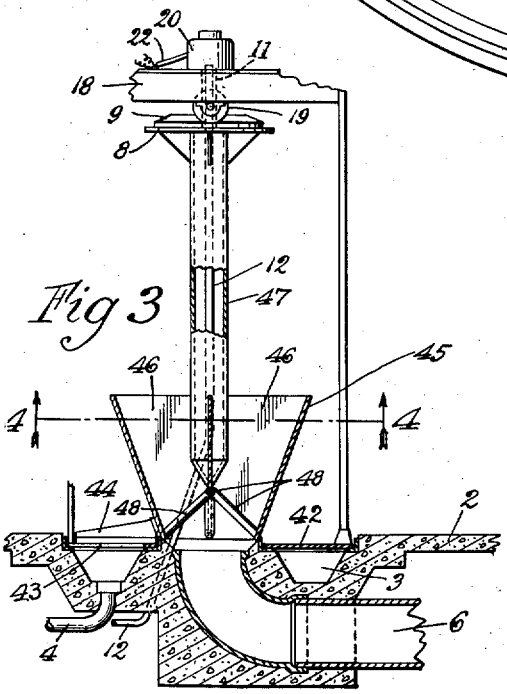
Figure 3 is a vertical sectional detail showing a modified form of inlet and central supporting column.
Figure 4:
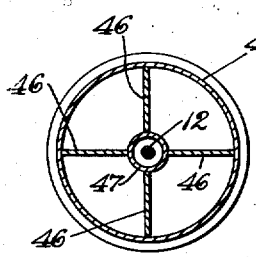
Figure 4 is a transverse sectional view taken along the line 4—4 of Figure 3.

In the modified form of the device shown in Figure 3, the influent conduit 6 discharges directly into a flaring flume 45 which is open at its top and provided with a plurality of divisions 46. A closed column 47 is positioned centrally of the flume 45 and braced and supported at its lower end by the divisions 46. The column 47 whether hollow or solid, is closed and no fluid enters it.

The lower edges of the division members 46 may, as shown in Figure 3, be rounded or provided with enlarged, rounded members 48. It has been found that this construction of edges which face in the direction of the influent makes it less likely that rags and other solids will become caught and retained upon the division members and should they become caught they are more readily removed.

Figure 5:
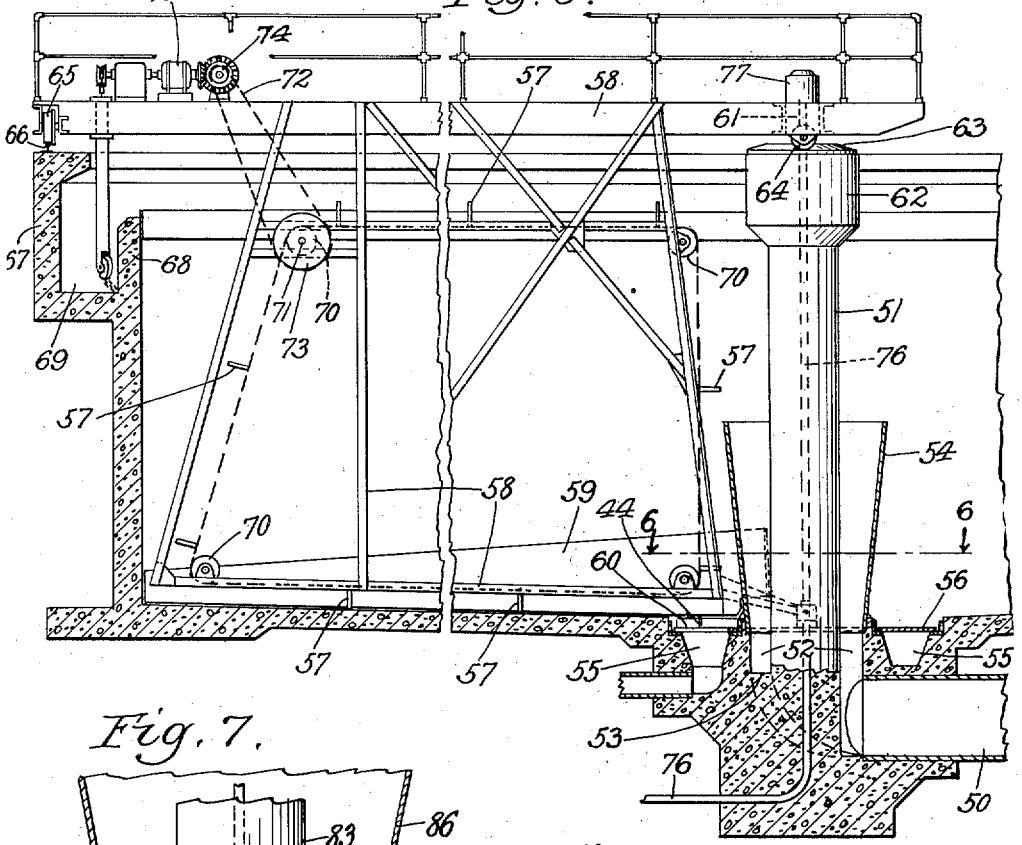
Figure 5 is a vertical section taken along a radial line of a modified form of the device.
Figure 6:
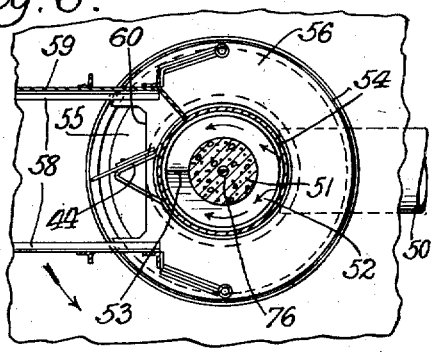
Figure 6 is a section along the line 6—6 of Figure 5.

In the modified form of the device shown in Figures 5 and 6, 50 is an influent pipe radially disposed beneath the bottom of the tank. 51 is a supporting column projecting upwardly above the bottom of the tank. Encircling it is an annular chamber 52 having a curved bottom, the bottom curving on both sides upwardly to a peak 53 at a point diametrically opposed to the axis of the influent pipe 50. Thereabove the chamber is annular in cross section. 54 is a funnel, flume or distributing inlet concentric with the column in continuation of the outer periphery of the chamber 52 extending upwardly to a point well below the liquid level in the tank. 55 is an annular sludge hopper encircling the distributing inlet, closed by a plate 56. 44 is a stationary plow mounted on the distributing inlet overlying the plate 56. The plate is apertured at 60 and receives sludge discharged by the sludge conveyor flights 57 supported on the bridge 58. The sludge plow 59 carried by the bridge is in line generally with one edge of the aperture 60 in the cover plate 56. The bridge is pivoted at 61 on an enlarged head 62 carried by the column 51. 63 is a track engaged by rollers 64 to support the inboard end of the bridge. The outboard end of the bridge is on rollers 65 traveling about the track 66, on the outer periphery of the tank 67.

The tank has a weir 68 and an effluent channel 69. The sludge conveyor scrapers or blades 57 on their return travel at the top of the tank and serve as scum plows. This conveyor travels over sprockets 70 and one pair of the sprockets 70 is driven by means of a shaft 71, chain 72, sprocket 73, 74 from a motor 75. The cover plate 56 rotates with the bridge so as to present the opening in the cover plate always to the sludge plow and sludge scraper flights. 76 is an electric conduit beneath the tank extending upwardly beneath the column 51 to a collector 77 whereby power for the motor is provided.

Figure 7:
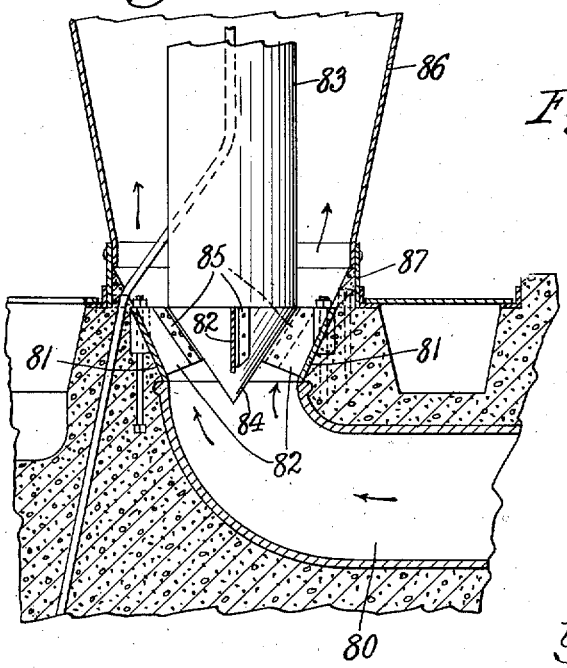
Figure 7 is a detail section through a modified form of the device.

In the modified form shown in Figure 7, the influent comes in through the elbow 80. At the top of the elbow is an annular ring 81 below the floor of the tank. This ring has inwardly extending webs 82. A column 83 having a pointed end 84 is provided with webs 85 adapted to be bolted to the webs 82. The distributing inlet 86 is mounted on an annular ring 87 bolted to the floor of the tank. The influent comes in through the webs and the pointed end of the column up through the expanding annular space between the distributing inlet 86 and the column 83 and is discharged to the tank.

Figure 8:
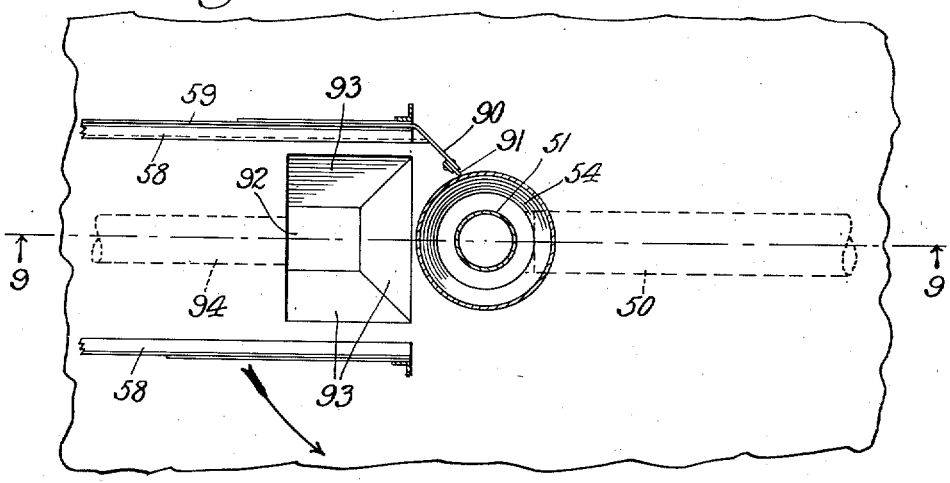
Figure 8 is a plan view of a modified form of scum hopper in which a small hopper is used instead of the annular hopper of the other figures.
Figure 9:
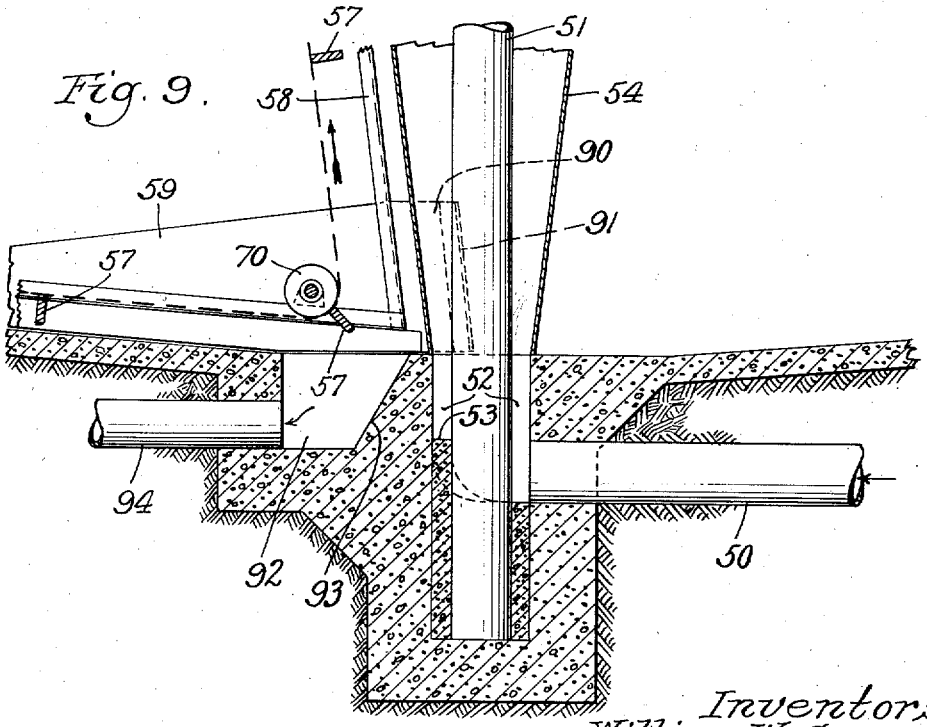
Figure 9 is a transverse vertical sectional detail taken at line 9—9 of Figure 8.

Figures 8 and 9 show a modification in the construction of the sludge discharge arrangement. Instead of having an annular sludge hopper as shown for example in the plan view of Figure 1 and elsewhere in the drawings, a small hopper is used. While such a small hopper might be used in connection with any of the forms of the device shown and in connection with any of the constructions of the influent opening or the central column and while it might be used in any other arrangement of influent conduit, even without a central column, it may conveniently be illustrated in one form as applied to the column and influent conduit generally like that shown in Figures 5 and 6. The arrangement of the bridge and its supporting structure may be the same as that shown in the other figures. The plow 59 is generally the same but it is preferably provided with an inclined end 90 which may carry at its inner end a flexible wiper 91. This inclined end 90 sweeps the portion of the floor of the tank closest to the column 51 and to the member 54, and the wiper may contact the member 54. The hopper shown, while it might be of any shape, is indicated as a generally rectangular hopper 92 which may have inclined sides 93 and from which sludge is drawn off through a sludge conduit 94.

Since the hopper is relatively small no cover is provided for it and the material picked up by the radially traveling conveyor by the plow 59 and its bent portion 90 and the wiper 91 is discharged into the hopper whenever the conveying assembly passis over it. It is shown in Figures 8 and 9 in the position to discharge into the hopper.

We claim:

1. In a sedimentation tank adapted to contain liquid, a floor, and a wall, and means for maintaining said liquid at a predetermined depth, a column extending upwardly through the floor thereof to a point adjacent the surface of the liquid within the tank, a chamber beneath the floor of the tank encircling the column having a discharge opening about the column through the floor of the tank and an influent conduit beneath the floor of the tank communicating with the chamber.

2. In a sedimentation tank adapted to contain liquid, a floor, and a wall, and means for maintaining said liquid at a predetermined depth, a column extending upwardly through the floor thereof to a point adjacent the surface of the liquid within the tank, a chamber beneath the floor of the tank encircling the column having a discharge opening about the column through the floor of the tank and an influent conduit beneath the floor of the tank communicating with the chamber, means defining a distributing inlet encircling the discharge opening and extending upwardly from the floor of the tank about the column.

3. In a sedimentation tank adapted to contain liquid, a floor and a wall and means for maintaining the said liquid at a predetermined depth, a column extending above the floor thereof to a point adjacent the surface of the liquid within the tank, an influent conduit beneath the floor of the tank and terminating adjacent the column, means encircling the column for guiding the influent from the conduit upwardly along the outer periphery of the column and discharging it into the body of liquid contained within the tank said means comprising a conduit discharging upwardly through the floor of the tank, having a discharge opening encircling the column.

4. In a sedimentation tank, an influent conduit beneath the floor thereof having a discharge opening through such floor, a supporting ring concentric with such discharge opening in the floor of the tank, radial webs projecting inwardly from such ring, a column carried by said webs and projecting upwardly, means defining a distributing inlet encircling the discharge opening and projecting upwardly from the floor of the tank around the column.

5. In a sedimentation tank, an influent conduit beneath the floor of the tank having a discharge opening through such floor, means defining a distributing inlet projecting upwardly from the floor of the tank encircling the discharge opening and terminating at a point adjacent the bottom of the tank, a plurality of structural members extending upwardly from the distributing inlet, a platform carried by said members and a deflector in line with the distributing inlet adjacent the discharge end thereof carried by said structural members, said deflector comprising a downwardly extended truncated cone, the central portion thereof being open.

6. In a sedimentation tank having a generally flat floor and a wall, conveying means mounted for rotation above the floor and means projecting from the floor upon which such means are supported, an influent conduit discharging upwardly through the floor adjacent the supporting means and an upwardly flared funnel associated with the supporting means in line with the conduit adapted to discharge liquid into the tank at a point intermediate the floor and the liquid level, said upwardly flared funnel terminating at its upper end at a point above said conveying means.

7. In a sedimentation tank, a column extending upwardly through the floor thereof, an annular chamber beneath the floor of the tank encircling the column having an annular discharge opening about the column through the floor of the tank and an influent conduit beneath the floor of the tank communicating with the annular chamber, a sludge hopper in the floor of the tank adjacent the annular discharge opening, means for withdrawing sludge from the hopper and means for conveying sludge from the tank floor and depositing it in the hopper.

8. In a sedimentation tank, a column extending upwardly through the floor thereof, a chamber beneath the floor of the tank surrounding the column having a discharge opening about the column through the floor of the tank and an influent conduit beneath the floor of the tank communicating with the chamber, a sludge hopper in the floor of the tank adjacent the discharge opening, means for withdrawing sludge from the hopper and means for conveying sludge from the tank floor and depositing it in the hopper.

9. In a sedimentation tank, a column extending upwardly through the floor thereof, a chamber beneath the floor of the tank surrounding the column having a discharge opening about the column through the floor of the tank and an influent conduit beneath the floor of the tank communicating with the chamber, a sludge hopper in the floor of the tank adjacent the discharge opening, means for withdrawing sludge from the hopper and means for conveying sludge from the tank floor and depositing it in the hopper, a tubular member surrounding the column and extending upwardly into the tank in general alignment and conformity to the contour of the outer periphery of the discharge opening.

10. In a sedimentation tank, a column extending upwardly through the floor thereof, a chamber beneath the floor of the tank surrounding the column having a discharge opening about the column through the floor of the tank and an influent conduit beneath the floor of the tank communicating with the chamber, a sludge hopper in the floor of the tank adjacent the discharge opening, means for withdrawing sludge from the hopper and means for conveying sludge from the tank floor and depositing it in the hopper, a shield projecting upwardly along the column between the discharge opening and the sludge hopper.

11. In combination with a sedimentation tank comprising a structure including a relatively flat floor and a boundary wall rising from the periphery thereof, the diameter of the tank being materially greater than its height, an influent chamber disposed in the structure beneath the floor of the tank having an influent port through the floor, a column extending upwardly from the floor of the influent chamber through the influent port and generally concentric therewith, an inlet pipe extending beneath the floor of the tank communicating at one end with the influent chamber and extending at the other end beyond the wall of the tank, a sludge hopper in the floor of the tank adjacent the influent port, a sludge pipe extending beneath the floor of the tank and communicating at one end with the sludge hopper and extending at the other end beyond the wall of the tank, a shield extending upwardly from the floor of the tank, generally conforming to the contour of the outer boundary of the influent port and encircling the column.

12. In a sedimentation tank, a column extending upwardly through the floor thereof, a chamber beneath the floor of the tank surrounding the column having a discharge opening about the column through the floor of the tank and an influent conduit beneath the floor of the tank communicating with the chamber, a sludge hopper in the floor of the tank adjacent the discharge opening, means for withdrawing sludge from the hopper, a tubular member surrounding the column and extending upwardly into the tank in general alignment and conformity to the contour of the outer periphery of the discharge opening.

13. In a sedimentation tank, a column extending upwardly through the floor thereof, a chamber beneath the floor of the tank surrounding the column having a discharge opening about the column through the floor of the tank and an influent conduit beneath the floor of the tank communicating with the chamber, a sludge hopper in the floor of the tank adjacent the discharge opening, means for withdrawing sludge from the hopper, a shield projecting upwardly along the column between the discharge opening and the sludge hopper.

14. In a sedimentation tank, a floor and a wall, a column extending upwardly through the floor thereof, a chamber beneath the floor of the tank surrounding the column having a discharge opening about the column through the floor of the tank and an influent conduit beneath the floor of the tank communicating with the chamber, means defining a distributing inlet encircling the discharge opening and extending upwardly from the floor of the tank about the column, a sludge hopper in the floor of the tank adjacent the discharge opening, means for withdrawing sludge from the hopper and mechanical means for positively conveying sludge from the tank floor and depositing it in the hopper.

15. In a sedimentation tank a floor and a wall, a column extending upwardly through the floor thereof, a chamber beneath the floor of the tank surrounding the column having a discharge opening about the column through the floor of the tank and an influent conduit beneath the floor of the tank communicating with the chamber, a sludge hopper in the floor of the tank adjacent the discharge opening, means for withdrawing sludge from the hopper and mechanical means for positively conveying sludge from the tank floor and depositing it in the hopper and a shield interposed between the sludge hopper and the discharge opening.

16. In a sedimentation tank, a floor and a wall, a column extending upwardly through the floor thereof, a chamber beneath the floor of the tank surrounding the column having a discharge opening about the column through the floor of the tank and an influent conduit beneath the floor of the tank communicating with the chamber, a sludge hopper in the floor of the tank adjacent the discharge opening, means for withdrawing sludge from the hopper and mechanical means for positively conveying sludge from the tank floor and depositing it in the hopper, and a shield interposed between the discharge opening and the mechanical sludge conveying means.

WILLIAM W. SAYERS.
RICHARD F. BERGMANN.
HAROLD F. WATSON.